(12) United States Patent
Aurongzeb et al.

(10) Patent No.: US 9,454,187 B2
(45) Date of Patent: Sep. 27, 2016

(54) BEZEL FOR PROVIDING IMPROVED USER EXPERIENCE

(71) Applicant: Dell Products L.P., Round Rock, TX (US)

(72) Inventors: Deeder M. Aurongzeb, Round Rock, TX (US); Erin K. Walline, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 14/458,729

(22) Filed: Aug. 13, 2014

(65) Prior Publication Data

US 2016/0048167 A1     Feb. 18, 2016

(51) Int. Cl.
| | |
|---|---|
| *G06F 1/16* | (2006.01) |
| *H04M 1/02* | (2006.01) |
| *G06F 3/02* | (2006.01) |
| *H04B 1/3888* | (2015.01) |
| *H04M 1/725* | (2006.01) |

(52) U.S. Cl.
CPC .......... *G06F 1/1652* (2013.01); *G06F 1/1656* (2013.01); *G06F 3/02* (2013.01); *H04M 1/0279* (2013.01); *H04B 1/3888* (2013.01); *H04M 1/72575* (2013.01)

(58) Field of Classification Search
CPC ...... G06F 1/1637; G02F 1/1333; H05K 7/14
USPC ........... 349/42, 65, 67, 61, 58, 187, 70, 158, 349/149, 151, 73, 139; 345/4, 581, 173, 8, 345/633, 589, 156, 419, 501, 211, 204; 429/120; 365/226; 361/679.02, 679.32, 361/679.08, 679.09, 679.52, 679.26, 361/679.27, 679.47, 679.31, 679.33
See application file for complete search history.

(56) References Cited

U.S. PATENT DOCUMENTS

| | | | |
|---|---|---|---|
| 4,612,241 A | 9/1986 | Howard, Jr. | |
| 5,145,935 A | 9/1992 | Hayashi | |
| 5,147,385 A | 9/1992 | Beck et al. | |
| 7,510,797 B2* | 3/2009 | Aker | H01M 2/1077 429/120 |
| 7,961,546 B2* | 6/2011 | Mair | G11C 5/147 365/226 |
| 8,890,771 B2* | 11/2014 | Pance | G06F 1/1647 345/4 |
| 2010/0127999 A1* | 5/2010 | Kim | G09B 21/003 345/173 |
| 2011/0164047 A1* | 7/2011 | Pance | G06F 1/1647 345/581 |
| 2013/0222725 A1* | 8/2013 | Nakahara | G02F 1/1333 349/42 |
| 2015/0092326 A1* | 4/2015 | Mantha | G06F 1/1616 361/679.3 |

* cited by examiner

*Primary Examiner* — Hung Duong
(74) *Attorney, Agent, or Firm* — Terrile, Cannatti, Chambers & Holland, LLP; Stephen A. Terrile

(57) ABSTRACT

A tablet type information handling system which includes a housing having one or more of the following characteristics: a holding pattern on a hard bezel and/or frame which minimizes biomechanical discomfort; a locally deformable bezel that may be used with semi-flexible tablet type information handling system such as those which include an OLED display; and, a multi-functional bezel to provide a tablet type information handling system with enhanced functionality. Additionally, in certain embodiments, the exterior portion of the bezel is molded over electro restrictive polymer for hand pressure response.

11 Claims, 5 Drawing Sheets

BEZEL FOR PROVIDING IMPROVED USER EXPERIENCE

BACKGROUND OF THE INVENTION

1. Field of the Invention

The present invention relates to information handling systems. More specifically, embodiments of the invention relate providing an information handling system with a locally deformable bezel for improved user experience.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide an information handling system as a tablet type information handling system. An issue relating to tablet type information handling systems is that such devices can cause joint discomfort due to prolonged holding of the system such as holding a planar surface such as the frame or bezel of the tablet type information handling system.

Additionally some tablet type information handling systems may include a thin architecture where the glass and side walls of the system may be so weak that direct pressing of the surface of the tablet information handling system may not be desirable. For example, tablet type information handling systems have been proposed which include an organic light emitting diode (OLED) display as well as some with a thin architecture with embedded sensors.

SUMMARY OF THE INVENTION

A system and method are disclosed for providing a tablet type information handling system with one or more of the following characteristics: a holding pattern on a hard basal and/or frame which minimizes biomechanical discomfort; a locally deformable bezel that may be used with semi-flexible tablet type information handling system such as those which include an OLED display; and, a multi-functional bezel to provide a tablet type information handling system with enhanced functionality. More specifically, in certain embodiments, a tablet type information handling system is provided where the bezel is configured using a multilayer approach where the outer surface of the bezel is soft elastic Estane. The bezel further includes a metal or indium tin oxide (ITO) traced glass insert so that pressure response or sensitivity can be recorded. This polymer configuration provides durability and a rubber-like, soft-touch feel for a range of over molded industrial and consumer applications. In certain embodiments, the polyester- and polyether-based grades are soft (e.g., in certain embodiments, the shore hardness value is less than 40). Additionally, in certain embodiments, the exterior portion of the bezel is molded over electro restrictive polymer for hand pressure response. It is possible to imprint commercial microelectromechanical systems (MEMS) based pressure sensor on the soft bezel to enable recording of pressure sensing directly into the computer operating system for pattern detection.

In certain other embodiments, a tablet type information handling system is provided where the bezel is flexible. More specifically, in certain embodiments, the bezel comprises a bending location which includes a low modulus of elasticity. In certain embodiments, the flexible bezel is formed via sequential molding of a polymer such as a sequence of a hard polymer, a soft polymer, and a hard polymer. Alternately, the bezel is formed using a natural rubber or an automobile tire type polymer where the rubber (or polymer) is selectively vulcanized or metalized for stiffness in all areas of the bezel except where the bending is desired.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
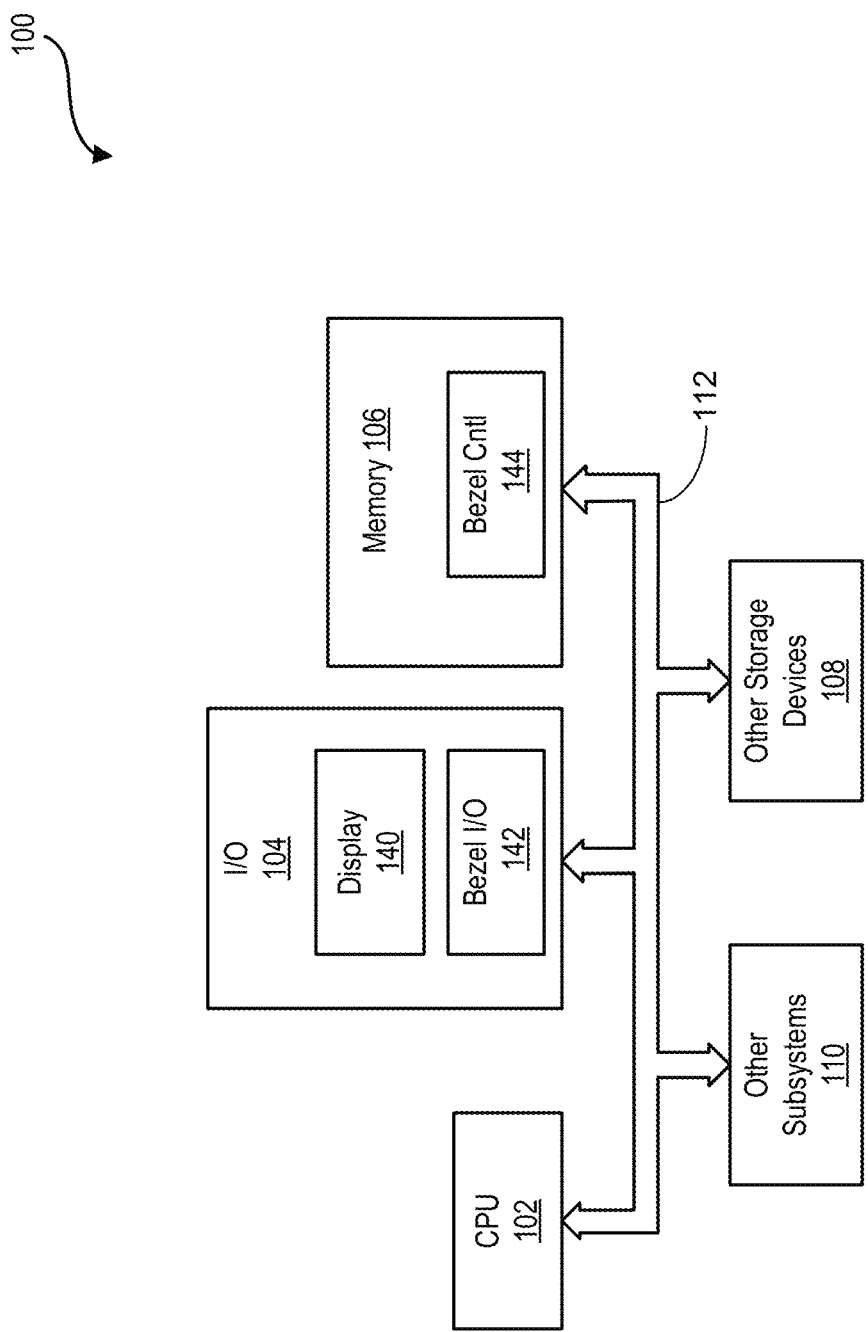
FIG. 1 shows s a general illustration of components of an information handling system as implemented in the system and method of the present invention.

FIG. 1 is a generalized illustration of an information handling system 100 that can be used to implement the system and method of the present invention. The information handling system 100 includes a processor (e.g., a central processor unit or "CPU") 102, input/output (I/O) devices 104, such as a display, a keyboard, a mouse, and associated controllers, memory 106, and various other subsystems 108. The information handling system 100 likewise includes other storage devices 110. The components of the information handling system are interconnected via one or more buses 112. In certain embodiments the information handling system 100 includes a touch sensitive display 140. Also in certain embodiments, the I/O devices 104 include a multi-function enhanced control bezel 142. Also, in certain embodiments, the information handling system comprises a bezel control system 144 stored within the memory 106 and including instructions executable by the processor 102.

Also, in certain embodiments, the information handling system 100 corresponds to a tablet type information handling system which includes a housing having one or more of the following characteristics: a holding pattern on a hard bezel and/or frame which minimizes biomechanical discomfort; a locally deformable bezel that may be used with semi-flexible tablet type information handling system such as those which include an OLED display; and, a multi-functional bezel to provide a tablet type information handling system with enhanced functionality. Additionally, in certain embodiments, the exterior portion of the bezel is molded over electro restrictive polymer for hand pressure response.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2A:
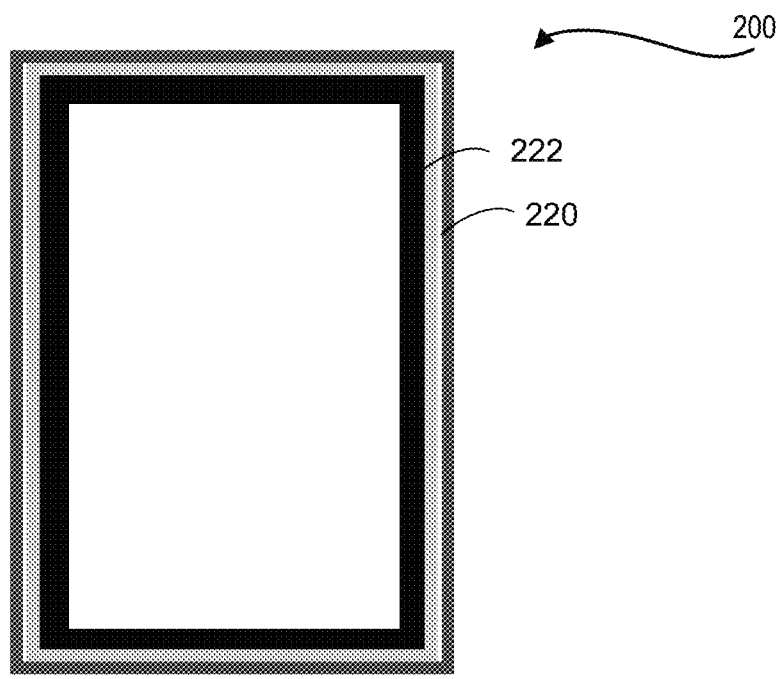
FIGS. 2A and 2B, generally referred to as FIG. 2, show diagrammatic front views of a tablet type information handling system having a locally deformable bezel.
Figure 2B:
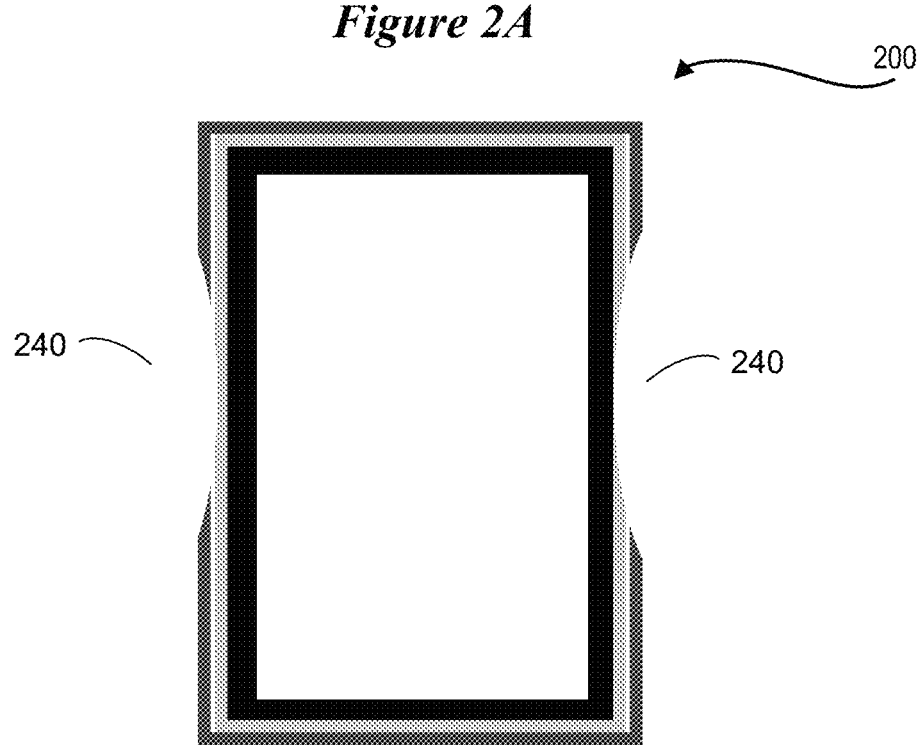

FIGS. 2A and 2B, generally referred to as FIG. 2, show diagrammatic front views of a tablet type information handling system 200 having a locally deformable bezel 202. More specifically, the locally deformable bezel 202 of the tablet type information handling system 200 the bezel is configured using a multilayer approach where the outer layer 220 of the bezel is soft elastic Estane. The bezel further includes a metal or indium tin oxide (ITO) traced glass insert so that pressure response or sensitivity can be recorded. This polymer configuration provides durability and a rubber-like, soft-touch feel for a range of over molded industrial and consumer applications. In certain embodiments, the polyester- and polyether-based grades are soft (e.g., in certain embodiments, the shore hardness value is less than 40).

FIG. 2A shows an example of how the outer layer 220 of the bezel 202 is deformed at certain holding locations 240 of the bezel when pressure is applied to the sides of the bezel (such as when the bezel is being held by a user). In certain embodiments, the bezel comprises a bending location which includes a low modulus of elasticity. Additionally, in certain embodiments, the flexible bezel is formed via sequential molding of a polymer such as a sequence of a hard polymer, a soft polymer, and a hard polymer. Alternately, the bezel is formed using a natural rubber or an automobile tire type polymer where the rubber (or polymer) is selectively vulcanized or metalized for stiffness in all areas of the bezel except where the bending is desired.

More specifically, in various embodiments the firmer layer 222 may be formed from a commercially available hard or rigid thermoplastic. More specifically, in certain embodiments, the firmer layer thermoplastic may include but not be limited to the following: polyethylene (PE), acrylonitrile-butadiene-styrene (ABS), polystyrene (PS), polycarbonate (PC), thermoplastic olefin (TPO), nylon (PA), polyacetal (PMMA), polyethylene terephthalate (PET), polybutylene terephthalate (PET), acrylonitrile styrene acrylate (ASA), polybutylene terephalate (PET) and polyester. Other blends, such as ABS-ASA, ABS-PA, ABSPBT, and the like. Additionally, in certain embodiments, the outer layer 220 may be formed from a commercially available soft thermoplastic such as commercially available soft or supple thermoplastic including thermoplastic thermoplastic olefin (TPO) and ionomers.

Alternately, in certain embodiments, the bezel is formed using a glass product such as that available under the trade designation Corning Willow glass, or using a tempered spring steel. In these embodiments, the steel or glass insert is located within a multi-shot tooling apparatus, the frame is formed by injecting a polymer such as a PVDF stress responsive polymer and the locally deformable portion (e.g., a polymer-Estane type polymer) is molded into the bezel.

Alternately, in certain embodiments, the bezel if formed so as to conform to finger pressure. In these embodiments, a frame, such as an aluminum frame, is formed such as by machining. The frame is then anodized. Next, a mold of soft electro restrictive polymer is formed over the frame. Alternately, a single cure epoxy may be used to bond a deformable cover (e.g., made with estate) to the frame.

Figure 3:
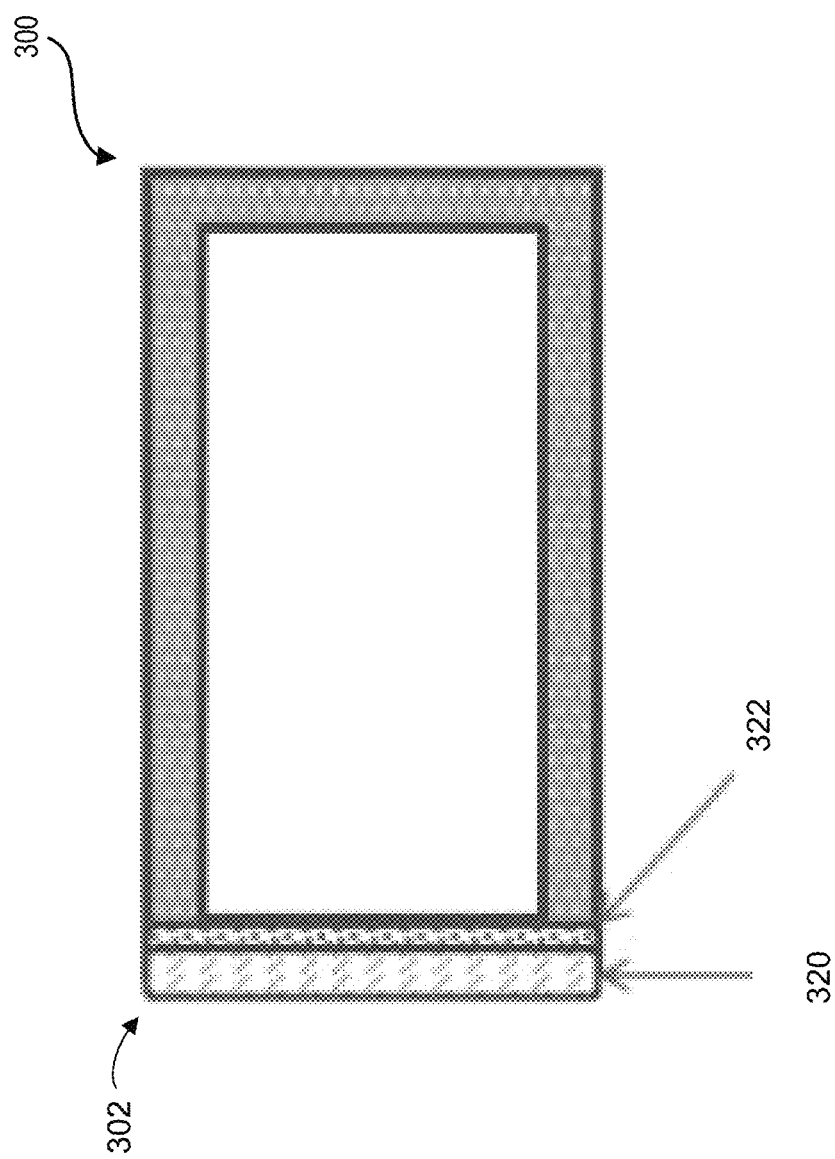
FIG. 3 shows a diagrammatic front view of a tablet type information handling system having an enhanced control bezel.

FIG. 3 shows a diagrammatic front view of a tablet type information handling system 300 having an enhanced control bezel 302. In certain embodiments, the tablet type information handling system having an enhanced control bezel comprises a bezel which includes a plurality of separately actuatable functional elements.

More specifically, the plurality of separately actuatable functional elements of the enhanced control bezel 302 comprise a hard polymer lexan portion 320 as well as an electro restrictive polymer portion 322 for pressure response.

Figure 4:
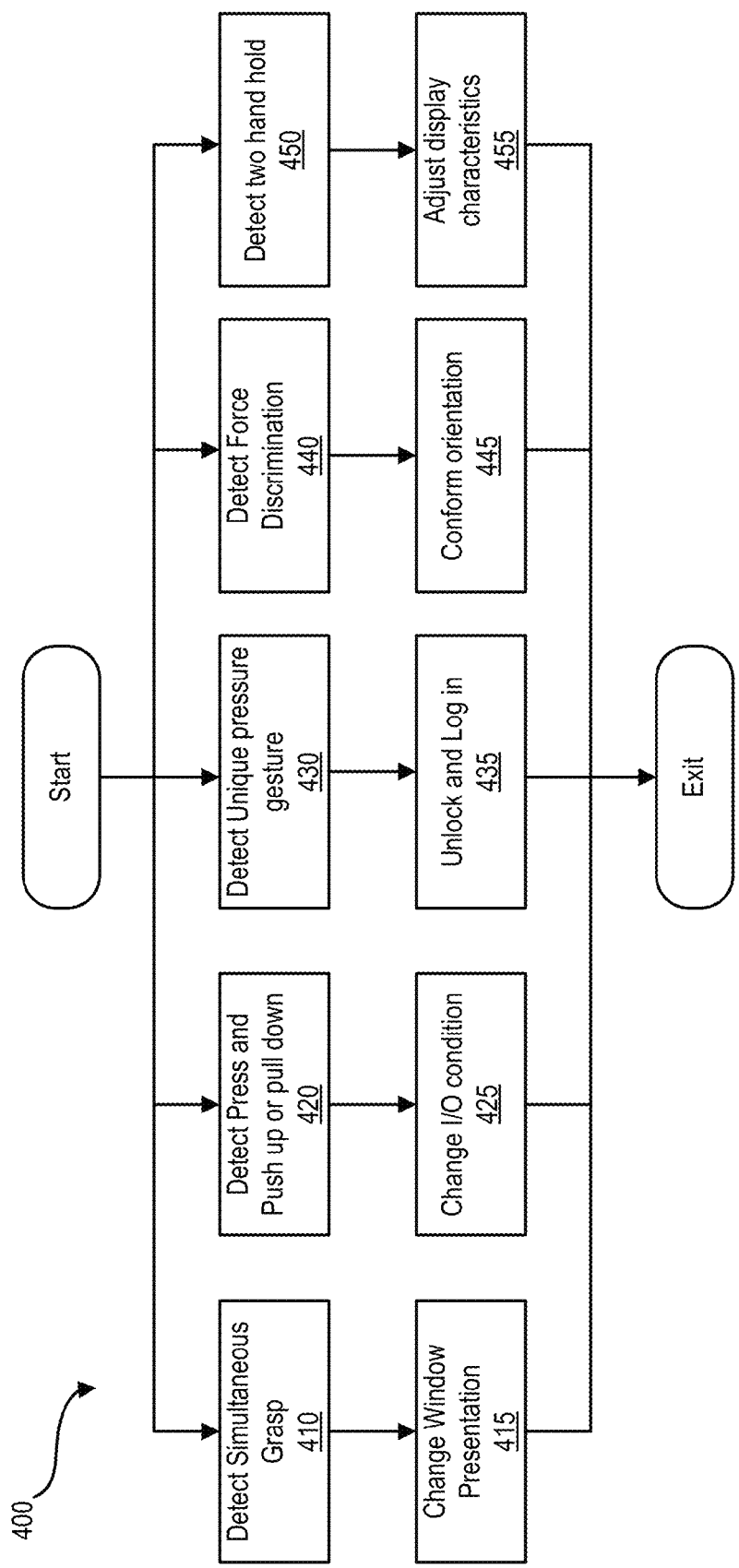
FIG. 4 shows a flow chart of the operation of a bezel control module for use with an enhanced control bezel.

FIG. 4 shows a flow chart of the operation 400 of a bezel control system 144 when used in conjunction with the enhanced control bezel 302. More specifically, when the enhanced bezel 302 detects a simultaneous grasp and press action at certain predefined locations 410, the bezel control system 144 causes a change of which window is presented as the active window on the display 140 (i.e., the window which is "on top" of the screen presentation) at step 415. When the enhanced bezel 302 detects a press and push up or down action at another predefined location 312 at step 420, the bezel control system 144 causes change to an input/output condition at step 425 such as either a volume or brightness increase or decrease. When the enhanced bezel 302 detects a unique pressure gesture at another predefined location 314 at step 430, the bezel control system 144 causes the tablet type information handling system to unlock and a user to be logged in 435. When the enhanced bezel 302 detects a force discrimination of orientation at a predefined location 316 (e.g., one of four home positions) at step 440, the bezel control system 144 causes the tablet type information handling system to orient the screen presentation to conform to the selected home position 445. When the enhanced bezel 302 detects pressure points and sensor data that indicates the system is being held with two hands for consumption at step 450, the bezel control system 144 causes the tablet type information handling system to adjust screen characteristics to accommodate an angle of use of the system 455.

Figure 5A:
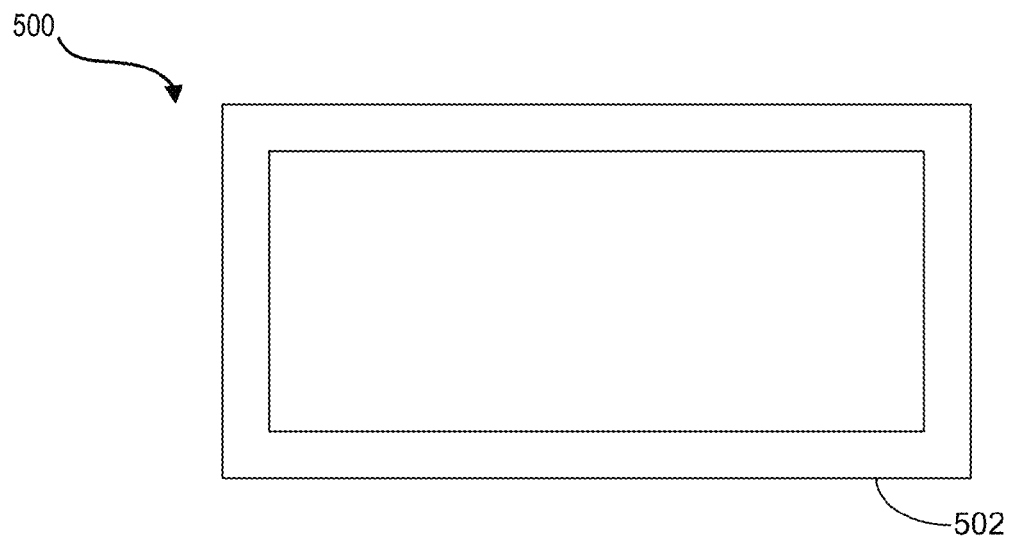
FIGS. 5A and 5B, generally referred to as FIG. 5, show diagrammatic front views of a tablet type information handling system having a semi-deformable flexible bezel.
Figure 5B:
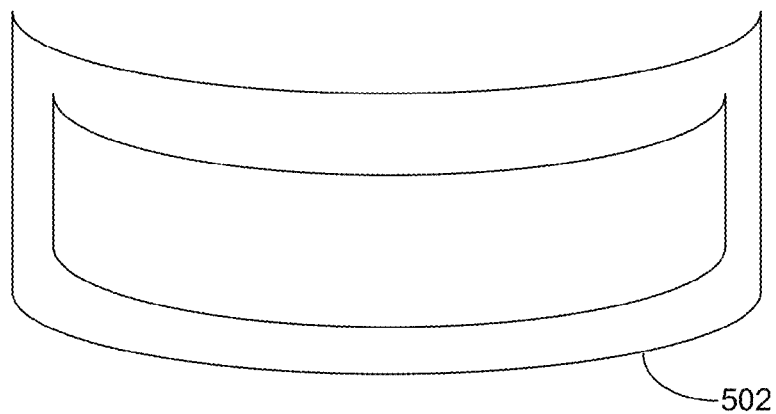

FIGS. 5A and 5B, generally referred to as FIG. 5, show diagrammatic front views of a tablet type information handling system 500 having a semi-deformable flexible bezel 502. Such a bezel 502 would be advantageous when providing a tablet type information handling system with a flexible display such as an organic light emitting diode (OLED) display.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, in certain embodiments, the information handling system could store a pressure value, a vector (i.e., direction of holding pattern of a user) and holding pattern for ad-hoc behavior or future log-in discrimination.

Consequently, the invention is intended to be limited only by the spirit and scope of the appended claims, giving full cognizance to equivalents in all respects.

What is claimed is:

1. A portable information handling system housing comprising:
    a frame; and,
    a locally deformable bezel outer portion surrounding the frame, the locally deformable bezel comprising a multi-layer polymer, the locally deformable bezel being configured to deform at holding locations of the portable information handling system housing; and wherein
    the portable information handling system comprises an organic light emitting diode (OLED) display; and,
    the locally deformable bezel deforms along with the OLED display.

2. The portable information handling system housing of claim 1, wherein:
    the locally deformable bezel outer portion is formed by molding a composite of rigid polymer, soft polymer, and a third rigid polymer thermo-mechanically bonded to the soft polymer.

3. The portable information handling system housing of claim 1, wherein:
    the composite comprises center portions of soft polymer with low modulus and shore hardness, the center portions corresponding to the holding locations.

4. A system comprising:
    a processor;
    a data bus coupled to the processor;
    a display coupled to the processor and the data bus; and
    a system housing, the system housing comprising
        a frame; and,
        a locally deformable bezel outer portion surrounding the frame, the locally deformable bezel comprising a multi-layer polymer, the locally deformable bezel being configured to deform at holding locations of the portable information handling system housing; and wherein
        the portable information handling system comprises an organic light emitting diode (OLED) display; and, the locally deformable bezel deforms along with the OLED display.

5. The system of claim 4, wherein:
the locally deformable bezel outer portion is formed by molding a composite of rigid polymer, soft polymer, and a third rigid polymer thermo-mechanically bonded to the soft polymer.

6. The system of claim 4, wherein:
the composite comprises center portions of soft polymer with low modulus and shore hardness, the center portions corresponding to the holding locations.

7. The system of claim 4, wherein:
the composite comprises center portions of soft polymer with low modulus and shore hardness, the center portions corresponding to the holding locations.

8. A portable information handling system housing comprising:
a frame; and,
a multi-functional enhanced control bezel, the multi-function enhanced control bezel providing provide the portable information handling system with enhanced input/output functionality; and a bezel control system stored on the memory, the bezel control system comprising computer program code, the computer program code comprising computer executable instructions configured for interacting with and controlling the multi-functional enhanced control bezel.

9. The portable information handling system housing of claim 8, wherein
the multi-functional enhanced control bezel comprises a plurality of separately actuatable functional elements.

10. The portable information handling system housing of claim 9, wherein:
the plurality of separately actuatable functional elements comprise a hard polymer lexan portion.

11. The portable information handling system housing of claim 9, wherein:
the plurality of separately actuatable functional elements comprise an electro restrictive polymer portion for pressure response.

* * * * *